UNITED STATES PATENT OFFICE.

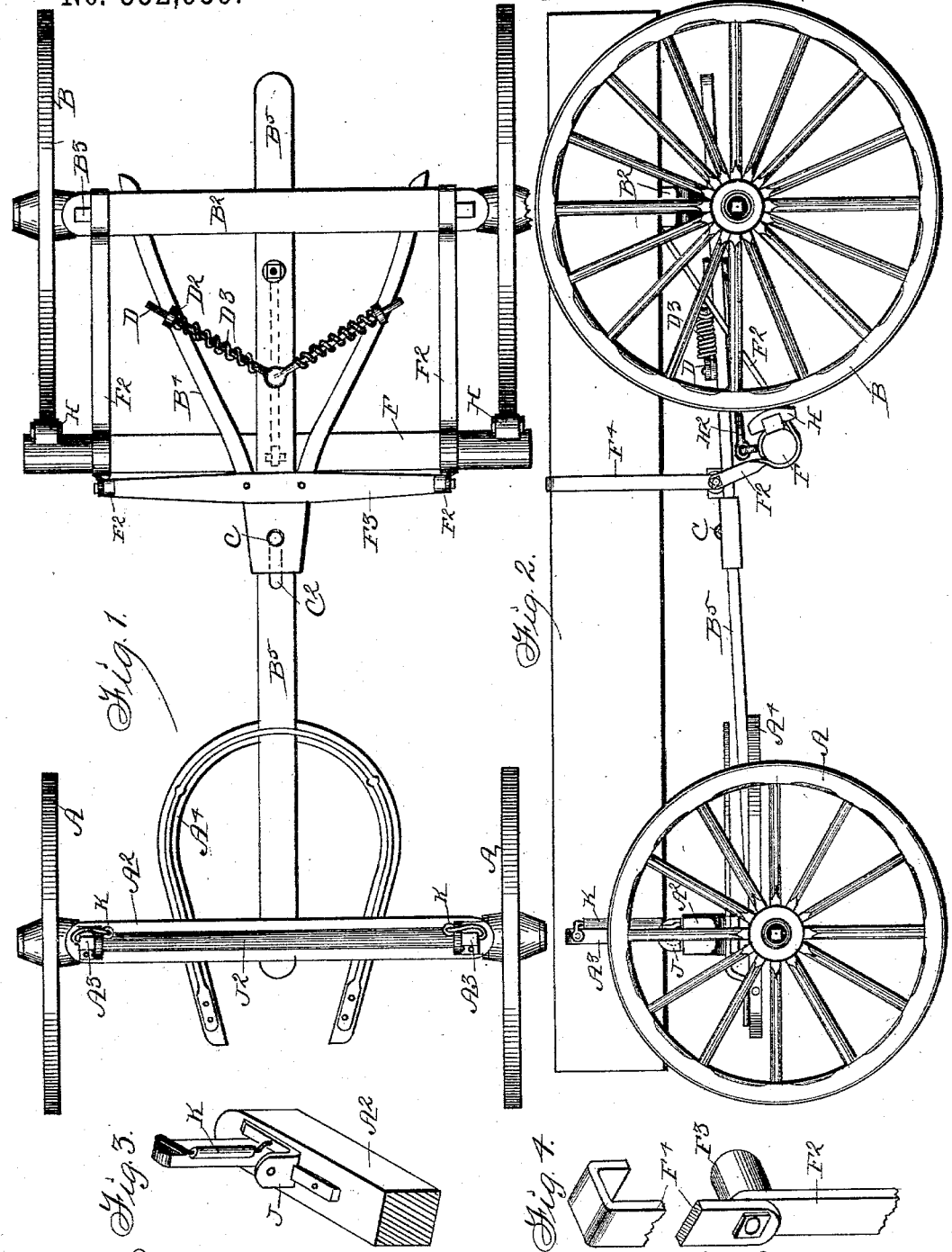

GEORGE J. HERMAN, JR., OF COLESBURG, IOWA.

AUTOMATIC WAGON-BRAKE.

SPECIFICATION forming part of Letters Patent No. 552,959, dated January 14, 1896.

Application filed September 9, 1895. Serial No. 562,021. (No model.)

*To all whom it may concern:*

Be it known that I, GEORGE J. HERMAN, Jr., a citizen of the United States of America, residing at Colesburg, in the county of Delaware and State of Iowa, have invented a new and useful Automatic Wagon-Brake, of which the following is a specification.

This invention relates to that class of vehicle-brakes in which the wagon-bed and rear trucks are slidingly connected with the front trucks, and the brakes automatically set by a forward movement of said rear trucks relative to the front trucks.

My object is to provide simple and durable means whereby the brake-shoes are normally held out of contact with the wheels and rattling of the parts prevented, and, further, to provide means whereby the pressure on the brakes is partially released when the wagon is backed.

My invention consists in certain details in the construction, arrangement and combination of parts, as hereinafter set forth, pointed out in my claim, and illustrated in the accompanying drawings, in which—

Figure 1 is a top view of the wagon running-gear, showing the invention applied. Fig. 2 is a side elevation of the same with a wagon-box in position. Fig. 3 is a detail perspective view showing one end of the forward bolster and the bracket for supporting the roller thereon, also the vertical roller supported by the standard. Fig. 4 is a detail perspective view showing part of the mechanism for supporting the brake-beam.

Referring to the accompanying drawings, the wagon running-gear is seen to be of the usual kind and comprises the front wheels, A, the front bolster, $A^2$, having the standards $A^3$ thereon, the front hounds, $A^4$, the rear wheels, B, the rear bolster and standards, $B^2$ and $B^3$, respectively, the rear hounds, $B^4$, and the reach $B^5$. All of these parts are of the usual construction and arranged in the ordinary manner with the exception of the reach $B^5$, which is fixed to the front bolster and slidingly connected with the rear hounds by means of a pin C passed through an opening in the hounds and through a longitudinal slot $C^2$ in the reach. This reach is normally held to its forward limit (as required to hold the brake-shoes out of contact with the wheels, as hereinafter explained) by means of the two rods D pivoted to the reach and extended rearwardly and outwardly therefrom and through openings in the lugs $D^2$, that are fixed to the hounds $B^4$. An extensile coil-spring $D^3$ is mounted on each rod with one end in engagement with one of said lugs and the other fixed to the rod.

F indicates a brake-beam extended transversely of the wagon directly in advance of the rear wheels and supported by the brackets $F^2$, in which it is capable of a rocking movement. These braces are attached at their ends to the rear bolster and a cross-piece $F^3$ that is fixed to the rear hounds. As an additional support for the brake-beam, bars $F^4$ are fixed to the forward ends of the brackets or to the cross-piece $F^3$ and bent inwardly and downwardly at their tops to overlap the sides of the wagon-box.

H H indicate brake-shoes secured to the ends of the brake-beam or positioned so as to engage the rear wheels when the beam is rocked rearwardly.

In backing the wagon on a level the frictional contact of the wheels on the brake-shoes will force them upwardly and thus permit the wagon to be easily backed.

$H^2$ indicates a rod pivotally attached to the top of the brake-beam extended rearwardly and fixed to the bottom of the reach. It will be seen that by this mechanism a rearward movement of the reach will set the brakes by rocking the brake-beam.

Mounted on the opposite ends of the front bolster are two brackets J J, and in the brackets is a roller $J^2$ to extend parallel with the top of the front bolster and support the front end of the wagon-box in such a manner as to permit its free longitudinal movement relative to the bolster.

K K indicate two vertical rollers supported at the inner surface of the front standards to prevent friction of the wagon-box against the standards.

In practical use, when the loaded wagon is descending an incline, it is obvious that the wagon-box and rear running-gear will move forwardly relative to the front wheels or running-gear, the rollers on the front bolster and standards permitting the box to slide thereon. This forward movement will overcome the rearward pressure of the springs $B^3$ and then rock the brake-beam, and thus apply the brake. When the wagon again reaches a level the said springs will tend to throw the brakes forwardly from the wheels and hold them in said position, and thereby prevent rattling.

In backing, the position of the brake-shoes that are in engagement with the wheels at a point above the center of the brake-beam, causes the shoes to readily move upwardly, and thus not obstruct the rearward rotation of the wheels.

Having thus described my invention, what I claim as new therein, and desire to secure by Letters Patent of the United States therefor, is—

In a wagon, an automatic wagon brake comprising a reach secured to the front truck and slidingly connected with the rear truck, a rock shaft mounted in suitable bearings in advance of the rear wheels, brake shoes fixed to its ends in a position to engage the rear wheels above the center of the said rock shaft, a bar connected with the top of the rock shaft and with the reach, two rods pivoted to the reach and slidingly connected with the rear hounds, and extensile coil springs on said bars, to normally hold the reach to its forward limit substantially as and for the purposes stated.

GEORGE J. HERMAN, JR.

Witnesses:
O. V. P. KNEE,
GEO. F. POTTS.